United States Patent
Lau et al.

(10) Patent No.: US 8,803,055 B2
(45) Date of Patent: Aug. 12, 2014

(54) VOLUMETRIC ERROR COMPENSATION SYSTEM WITH LASER TRACKER AND ACTIVE TARGET

(75) Inventors: Kam C. Lau, Potomac, MD (US); Yuanqun Liu, North Potomac, MD (US); Guixiu Qiao, Boyds, MD (US); Liangyun Xie, Gaithersburg, MD (US)

(73) Assignee: Automated Precision Inc., Rockville, MD (US)

( * ) Notice: Subject to any disclaimer, the term of this patent is extended or adjusted under 35 U.S.C. 154(b) by 671 days.

(21) Appl. No.: 12/654,911

(22) Filed: Jan. 8, 2010

(65) Prior Publication Data
US 2010/0176270 A1 Jul. 15, 2010

Related U.S. Application Data

(60) Provisional application No. 61/193,932, filed on Jan. 9, 2009.

(51) Int. Cl.
*G01B 11/14* (2006.01)
*G01J 1/20* (2006.01)
*G01C 3/08* (2006.01)

(52) U.S. Cl.
USPC ............. 250/203.2; 250/206.2; 250/222.1; 250/559.33; 356/3.09; 356/4.01; 356/508; 356/139.04; 356/152.3; 356/614

(58) Field of Classification Search
USPC ........... 250/221, 222.1, 206.1, 206.2, 203.1, 250/203.2, 203.3, 559.29, 559.33; 356/138, 356/139.03, 139.04, 152.1, 152.3, 614, 356/3.01, 3.09, 4.01, 496, 498, 508
See application file for complete search history.

(56) References Cited

U.S. PATENT DOCUMENTS

| | | | |
|---|---|---|---|
| 4,003,658 A * | 1/1977 | Kelsall | 356/520 |
| 4,393,597 A * | 7/1983 | Picard et al. | 33/275 G |
| 4,621,926 A | 11/1986 | Merry et al. | |
| 5,127,735 A * | 7/1992 | Pitt | 356/500 |
| 5,309,212 A * | 5/1994 | Clark | 356/5.09 |
| 5,408,409 A * | 4/1995 | Glassman et al. | 600/407 |
| 5,589,928 A * | 12/1996 | Babbitt et al. | 356/4.1 |
| 5,633,716 A | 5/1997 | Corby, Jr. | |
| 5,666,202 A * | 9/1997 | Kyrazis | 356/614 |
| 5,893,214 A * | 4/1999 | Meier et al. | 33/293 |
| 5,920,394 A * | 7/1999 | Gelbart et al. | 356/615 |
| 6,392,222 B1 | 5/2002 | Greenwood | |
| 6,415,273 B1 * | 7/2002 | Fujime | 706/16 |

(Continued)

*Primary Examiner* — John Lee
(74) *Attorney, Agent, or Firm* — Stephen F.K. Yee, LLC; Stephen F. K. Yee

(57) ABSTRACT

A volumetric error compensation measurement system and method are disclosed wherein a laser tracker tracks an active target as the reference point. The active target has an optical retroreflector mounted at the center of two motorized gimbals to provide full 360 degree azimuth rotation of the retroreflector. A position sensitive detector is placed behind an aperture provided at the apex of the retroreflector to detect the relative orientation between the tracker laser beam and the retroreflector by measuring a small portion of the laser beam transmitted through the aperture. The detector's output is used as the feedback for the servo motors to drive the gimbals to maintain the retroreflector facing the tracker laser beam at all times. The gimbals are designed and the position of the retroreflector controlled such that the laser tracker always tracks to a pre-defined single point in the active target, which does not move in space when the gimbals and/or the retroreflector makes pure rotations. Special mechanism and alignment algorithm are used in the gimbal design and retroreflector centering alignment to achieve accurate rotational axis alignment and repeatability.

26 Claims, 5 Drawing Sheets

(56) References Cited

U.S. PATENT DOCUMENTS

| | | |
|---|---|---|
| 6,420,694 B1 | 7/2002 | Greenwood |
| 7,230,689 B2 | 6/2007 | Lau |
| 7,400,416 B2 * | 7/2008 | Lau ................. 356/614 |
| 7,576,847 B2 * | 8/2009 | Bridges ................. 356/138 |
| 7,800,758 B1 * | 9/2010 | Bridges et al. ............. 356/482 |
| 8,184,059 B2 * | 5/2012 | Bunch et al. .................. 343/766 |
| 8,422,034 B2 * | 4/2013 | Steffensen et al. ............ 356/614 |
| 8,467,072 B2 * | 6/2013 | Cramer et al. ................ 356/620 |
| 8,472,029 B2 * | 6/2013 | Bridges et al. ................ 356/498 |
| 8,514,405 B2 * | 8/2013 | Nara ............................. 356/498 |
| 8,525,983 B2 * | 9/2013 | Bridges et al. ................ 356/138 |
| 8,558,992 B2 * | 10/2013 | Steffey .......................... 356/4.01 |
| 8,570,493 B2 * | 10/2013 | Mertz et al. .................. 356/3.01 |
| 8,593,648 B2 * | 11/2013 | Cramer et al. ................ 356/620 |
| 8,654,354 B2 * | 2/2014 | Steffensen et al. ............ 356/614 |
| 8,659,752 B2 * | 2/2014 | Cramer et al. ................. 356/138 |
| 8,670,114 B2 * | 3/2014 | Bridges et al. ................. 356/138 |
| 2003/0043362 A1 * | 3/2003 | Lau ................................. 356/4.09 |
| 2006/0071134 A1 * | 4/2006 | Dent et al. .................... 248/274.1 |
| 2006/0102602 A1 * | 5/2006 | Dane et al. ................... 219/121.73 |
| 2006/0102604 A1 * | 5/2006 | Dane et al. ................... 219/121.74 |
| 2006/0102609 A1 * | 5/2006 | Dane et al. ................... 219/121.85 |
| 2006/0192090 A1 * | 8/2006 | Lau ................................. 250/221 |
| 2006/0258935 A1 * | 11/2006 | Pile-Spellman et al. ....... 600/416 |
| 2007/0061043 A1 * | 3/2007 | Ermakov et al. .............. 700/263 |
| 2009/0115850 A1 * | 5/2009 | Nakamura ..................... 348/169 |
| 2009/0216394 A1 * | 8/2009 | Heppe et al. ..................... 701/16 |
| 2010/0128259 A1 * | 5/2010 | Bridges et al. ................. 356/138 |
| 2010/0149525 A1 * | 6/2010 | Lau .......................... 356/139.03 |
| 2010/0176270 A1 * | 7/2010 | Lau et al. .................... 250/203.2 |
| 2010/0219170 A1 * | 9/2010 | Dane et al. ................... 219/121.73 |
| 2011/0228252 A1 * | 9/2011 | Souvestre et al. ............. 356/5.01 |

* cited by examiner

VOLUMETRIC ERROR COMPENSATION SYSTEM WITH LASER TRACKER AND ACTIVE TARGET

REFERENCE TO RELATED APPLICATION

The present application claims priority benefit of U.S. Provisional Application No. 61/193,932, entitled Volumetric Compensation System with Laser Tracker and Active Target, filed Jan. 9, 2009.

BACKGROUND OF THE INVENTION

1. Field of the Invention

The present invention relates generally to a measuring system. In particular, the system and method of the invention are directed to a position measuring system incorporating a laser tracker and an active target. The active target of the position measuring system is capable of 360 degree rotational tracking range to maintain alignment with the tracker laser beam at all times. The position measuring system offers unique advantages in manufacturing processes wherein the position of the machine or machine tool must be precisely determined and any positional errors due to changes in the temperature, mechanical alignment or the like can be detected and corrected.

2. Related Art

Precision measuring systems have a wide variety of applications. In three-dimensional metrology applications such as robotics, laser pointing, laser tracking interferometry and laser radar measurement systems, accurate positioning and orientation is often required of a robot, a device coupled to the robot, a machine tool or other mechanical positioning devices, including various types of computer numerical control devices. To achieve a high degree of precision, a position measuring system can be used. Such a system typically uses a laser beam interferometer and a retroreflector as a target, wherein the target is illuminated by the interferometer and the reflected light detected and analyzed to determine the position and/or orientation of the retro-reflective target. As an example, a retro-reflective target can be mounted upon the end effector of a robot and the system can monitor the position and orientation of the end effector in real-time while providing accuracy, speed and measurement data.

Since the position of a retro-reflective target can be precisely determined, retro-reflective targets are widely employed during the manufacture of parts demanding high precision, such as parts fabricated for the aerospace and automobile industries. In these applications, retro-reflective targets can be mounted upon machines, such as robots or other machine tools, utilized during the manufacture of precision parts such that the position of the machine can be precisely determined and any positional errors, such as positional errors due to changes in the temperature, mechanical alignment or the like between the tool and the part, can be detected and corrected.

When using large machine tools in large-volume work spaces many factors can conspire to reduce the accuracy of the tool throughout its working volume. Factors like machine load, force of cutting, foundational deviations, and simple wear over time make the machine less accurate.

As an illustrative example, in the manufacture of large-scale precision parts, such as those produced in the aerospace and automotive industries, large-scale machine tools are used to process large-scale parts. The manufacturing processes are performed in large volumetric work spaces, in which the side dimensions of the work platforms can exceed 200 meters. The machine tools exhibit dimensional positioning errors that are difficult to minimize. The primary sources of these positioning errors are the expansion and contraction of the machine structure and the workpiece due to temperature changes in the work space during machining, and mechanical misalignments of and between individual axes of the machine. These positional errors need to be monitored, detected and corrected to produce consistently high-quality precision parts.

Most existing solutions to these problems involve highly specialized measuring equipment and substantial machine downtime for measurements. Traditional methods often taken several days to perform and require repeated set-up changes of the measuring equipment. Accurate results are almost impossible due to temperature fluctuations during this, long process. The common three-axis machines have 21 error parameters in addition to the errors introduced with the machine spindle. Machine calibration techniques measures some or all of these 21 error parameters, then makes physical or software adjustments to the parameters which are out of tolerance. Many times even with these complicated techniques only a fraction of the 21 error parameters in a given machine volume are actually measured. Since so many of the possible machine errors are not accounted for, the final results of this type of machine error compensation are not satisfactory for improved production quality and speeds. With the machine tool being idle for several days during the measurement process, it is not uncommon for tens to hundreds of thousands of production dollars to be lost due to machine downtime.

Improving the accuracy of a machine, automated tool, or robot so that parts are manufactured closer to design specifications involves augmenting the machine control with an independent, higher-accuracy position measurement system to correct for machine-related and factory-induced errors. The independent measuring system identifies the true position of the end effector when the machine stops prior to machining. This machine control augmentation process to correct for the machine and factory-induced errors can be referred to as volumetric error compensation of the machine tool.

Ideally retroreflectors used in these applications should have an unlimited field of view such that the retroreflector can receive and reflect light that impinges upon the retroreflector from any direction. Conventional retroreflectors have a limited field of view known as an acceptance angle or angular working range. Light received by a retroreflector within the acceptance angle is reflected by the retroreflector. However, light outside of the acceptance angle is not reflected and, therefore, cannot be utilized to determine the position of the retroreflector. Thus, the acceptance angle of a retroreflector restricts the position and orientation of the retroreflector relative to the light source. This limitation is particularly disadvantageous in applications in which the retroreflector is mounted upon a machine, such as a robot or other machine tool, that can move in multiple directions and about multiple axes relative to the light source and may frequently be positioned such that the retroreflector does not face the light source, thereby preventing the light emitted by the light source from falling within the acceptance angle of the retroreflector. Without adding additional light sources and/or additional retroreflectors which would, in turn, increase the cost and complexity of the precision measuring system, the position of the machine can therefore not be determined in instances in which the retroreflector does not face the light source.

One commonly-used retroreflector is a trihedral prism reflector that is frequently referred to as a solid corner cube retroreflector. While trihedral prisms are relatively inexpensive and are fairly accurate with respect to the parallelism of the incident and reflected beams, they are limited to an acceptance angle of about +/−20° and still be able to provide good accuracies. With this type of prismatic retroreflector, use of a different type of materials can increase the acceptance angle up to +/−50°. However, accuracies are poor.

Another type of retroreflector is a hollow corner cube retroreflector that is constructed of three mutually orthogonal mirrors. Although the lateral displacement between the incident and reflected beams does not vary as a function of the incidence angle, a hollow corner cube retroreflector is more expensive than a comparable trihedral prism reflector. A hollow corner cube retroreflector typically has an acceptance angle of about +/−20°, which is comparable to that of the trihedral prism reflector.

A third type of retroreflector used is a cat eye in which several hemispherical lenses are bonded to form a single optical element. While a cat eye has a larger acceptance angle, about +/−60°, a cat eye is significantly more expensive than a trihedral prism retroreflector or a hollow corner cube retroreflector. Although a cat eye has a much greater acceptance angle than the other two types of retroreflectors, the acceptance angle is still insufficient in many situations, particularly in many high precision manufacturing operations in which the retroreflector will be mounted upon the end effector of a robot or other machine tool that will assume many different positions during the manufacturing process. Moreover, the material from which the cat eye retroreflector is made affects its refractive characteristics. Thus, the cat eye does not work well with a laser beam having different frequency wavelengths. In a typical interferometer tracking laser, visible light is used with the interferometer while infrared light is used for the absolute distance measurement (ADM).

Thus, although a variety of retroreflectors are available, these conventional retroreflectors do not have acceptance angles that are sufficiently large and continuous as required by some applications. Preferably, retroreflectors which are mounted upon the end effector of a robot or other machine tool should have an extremely large acceptance angle since the retroreflectors will be moved through a wide range of positions during typical machining operations. As such, there remains a need for a retroreflector having a much larger acceptance angle than conventional retroreflectors, while still being capable of being economically manufactured and deployed.

Volumetric compensation of large machine tools using a laser tracker-based volumetric error compensation (VEC) system requires that the tracker track to a well-defined reference point on the machine during the measurement. This point usually is on the axis of rotation of the machine spindle or tool holder. Traditionally, a spherical mounted retroreflector (SMR) optical target, which is a standard tracking target for a laser tracker system, is attached to the spindle and aligned to the axis of rotation to establish the measurement reference point. A SMR employing any of the above-described retroreflectors, however, has a limited angular working range, or acceptance angle, from ±20 to ±25 degrees. Although a cat eye retroreflector provides a greater angular working range, it still is insufficient for many applications. A typical VEC measurement requires 360 degree angular tracking range. This requires that the SMR retroreflector face the tracker laser beam at all times during the measurement. This is usually achieved by repeatedly rotating the SMR manually every 20 degrees or so during the measurement session. This human intervention greatly slows down the measurement speed and increases the uncertainties of the overall measurement quality. Operator's safety is also a great concern.

Attempts have been made to overcome some of the foregoing issues. In one prior-art attempt, Greenwood (U.S. Pat. Nos. 6,420,694 and 6,392,222) describes a steerable retroreflective system in which leakage laser light passing through a retroreflector and impinging on an optical detector provide signals used by control positioners to steer the retroreflector and keep it aligned with the tracker beam. This system is stated to have an acceptance angle of 320 degrees or more. However, a relatively-wide 40 degree angle can not be covered.

Corby (U.S. Pat. No. 5,633,716) describes a retroreflector assembly in which a misalignment detector is used to maintain alignment of the reflected laser beam within the acceptance angle of the tracker detector. In one embodiment, the misalignment detector uses light from a source located on the tracker impinging on a photodetector to generate corrective signals for azimuth and elevation actuators to control positioning of the reflector. In another embodiment, a portion of the incident beam is provided to the photodetector. In both embodiments, the reflector target is mounted on a cradle, and the misalignment detector is mounted in a fixed orientation relative to the reflector.

Merry et al. (U.S. Pat. No. 4,621,926) describes an interferometer control system using a target capable of pivoting about a horizontal shaft. Motors on the tool holder itself reciprocate and rotate the tool holder and the attached target along the z-axis. However, complete rotation of the target about the z-axis is not possible since anything more than a nominal rotation in either direction will break the line-of-sight between the target and the tracking laser beams. In the tracker head, the output signal from a position-sensitive detector is used to control the position of the tracking mirror such that the output laser beam strikes the center of the retroreflector.

Thus, for precision measuring systems in which the retroreflectors will be moved through a wide range of positions during typical machining operations, it is desirable for the retroreflector to have an extremely large acceptance angle. In order to have the capability of precisely determining the position of a machine as the machine assumes a variety of positions such that the machine can be driven to compensate for positional inaccuracies and to form parts with precise dimensions, a need remains for a precision measuring system having an active target that provides a full, unlimited 360 degree angular working range.

SUMMARY OF THE INVENTION

This present invention incorporates an active target in a volumetric error compensation measurement system to solve the above-mentioned problems. The active target has an optical retroreflector mounted at the center of two motorized gimbals. The apex of the retroreflector is provided with an opening, or aperture. A position sensitive detector is placed behind the retroreflector to detect the relative orientation between the tracker laser beam and the retroreflector by means of measuring a small portion of the laser beam transmitted through the aperture. The detector's output is used as the feedback for the servo motors to drive the gimbals to maintain the retroreflector facing the tracker laser beam at all times.

The gimbals are designed and the retroreflector is positioned and controlled such that the laser tracker always tracks to a pre-defined single point in the active target, which does not move in space when the gimbals and/or the retroreflector makes pure rotations. Since the gimbals can provide a full 360 degree rotation, the active target of the present invention overcomes the limitations of the commonly-used SMR.

The retroreflector can be of the "hollow" type or "prismatic" type. In the case of a prismatic retroreflector, a virtual optical center is created to eliminate laser beam lateral movement during retroreflector rotation. Proprietary mechanisms and alignment algorithms developed by the Applicant are used in the gimbal design and retroreflector centering alignment to achieve accurate rotational axis alignment and repeatability. The Applicant's special mechanism design provides the present invention with unlimited 360 degree rotation capability. The software incorporated in the present invention provides absolute distance measurement (ADM) offset to adjust virtual optical center offset. The software also performs collision detection to provide no-loss beam and collision-free measurement plan.

The approach to volumetric error compensation (VEC) of the present invention addresses all of the shortcomings of traditional methods and makes machine compensation easy and far more affordable. The machine tool's precision can be increased between four and tenfold in a matter of hours rather than days. The present invention's VEC measures the machine's complete working volume and gives a true volumetric compensation for every point.

The VEC process of the present invention provides a fast and highly accurate compensation of machine tools. Since all of the measurements are achieved very quickly, there is very little thermal drift due to temperature fluctuations The novel features and advantages of embodiments of the present invention will be better understood from the following description considered in conjunction with the accompanying drawings wherein like reference numbers designate like elements throughout, and primed reference numbers are used to indicate similar elements in alternate embodiments. It should be expressly understood, however, that the drawings are for purposes of illustration and description only and are not intended as a definition of the limits of the invention.

DETAILED DESCRIPTION OF THE PREFERRED EMBODIMENTS

The present invention will now be described more fully hereinafter with reference to the accompanying drawings, in which preferred embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art.

Figure 1:
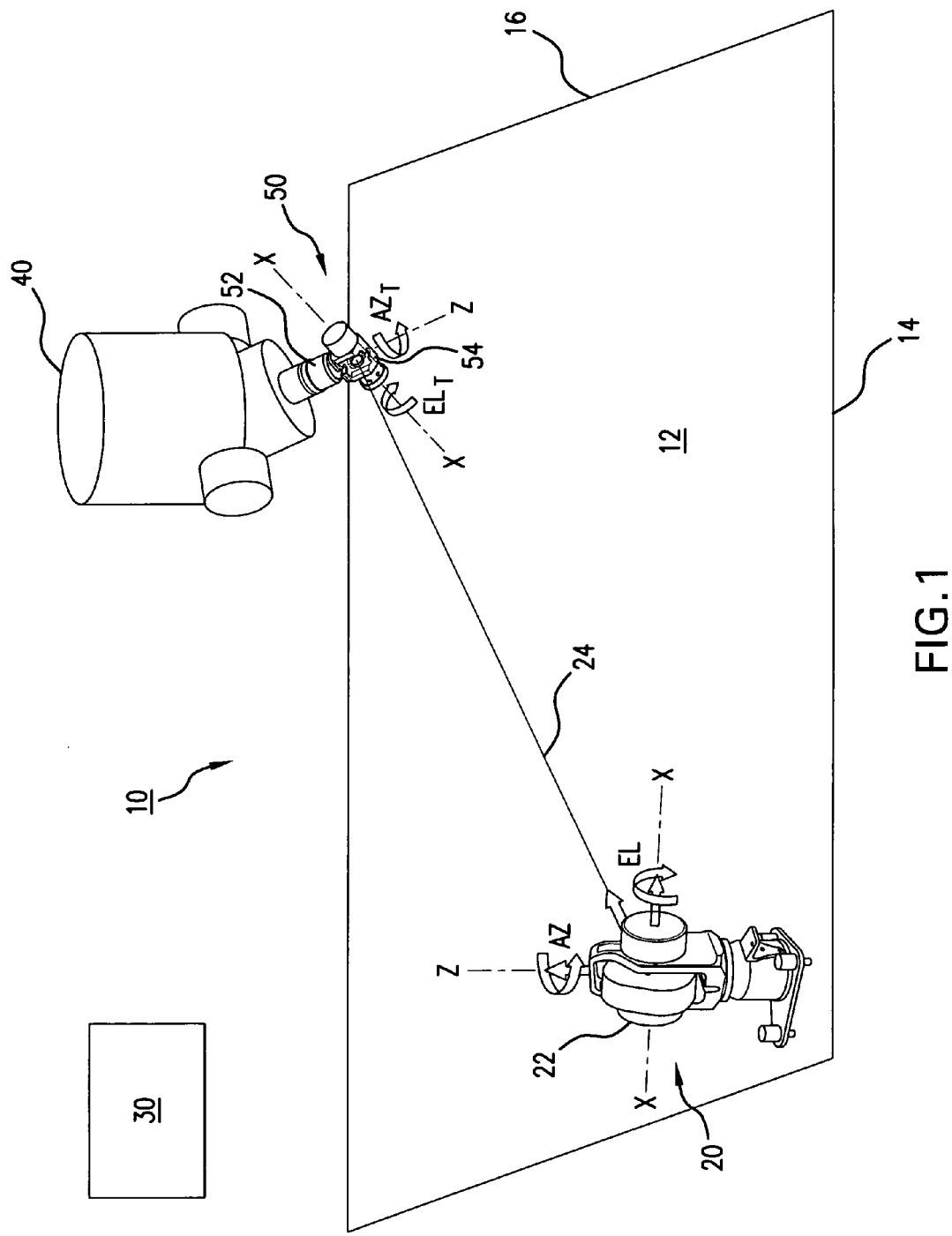
FIG. 1 is a schematic diagram illustrating a precision measurement system incorporating an exemplary embodiment of the active target of the present invention.

FIG. 1 is a schematic diagram illustrating a precision, coordinate measurement system in a large-scale machining facility which incorporates an exemplary embodiment of the active target of the present invention. For greater clarity of illustration, the structural features and machinery customarily associated with such machining facility have not been shown. These structural features, machinery and related elements are known to those skilled in the art.

A large-volume work space 10 includes a platform 12 having sides 14 and 16 which, in facilities processing larger work pieces, may extend several hundred feet in length. Platform 12 may be the floor of the factory in which the machining operation occurs, or the platform may be a machine table on which is supported the workpiece being machined. Also not shown in FIG. 1 are the machines and the support/guide tracks which are used to move and manipulate the workpiece.

Located on or adjacent to platform 12 is a laser tracker 20, with a tracking head 22. Tracking head 22 is the source of the illuminating laser beams 24 and, under control of a control unit 30, is rotatable in elevation (EL), or rotation about an x-axis, and in azimuth (AZ), or rotation about a z-axis, as indicated in FIG. 1. The coordinate x- and z-axes shown are with reference to laser tracker 20, with the y-axis being orthogonal and directed toward the active target 50.

Data and control communication between the control unit 30 and laser tracker 20 may be with wired connections or by a wireless link, as is known to those skilled in the art. Control unit 30 outputs the position information about laser tracker 20 and active target 50. The control unit 30 also provides functional and measurement control, data capture, processing, computation and other functions. As illustrative examples, control unit 30 can be a computer, a feedback input for a position control device, a display, a guidance system, or the like.

One or more of the laser beams 24 can be used to communicate position information about active target 50 back to laser tracker 20. Thus, for example, after an initial distance is determined, the laser beam used for the absolute distance measurement can be used for data communication and the interferometer-based laser used for the radial distance measurements. Alternatively, a dedicated laser can be incorporated into the system that would allow full time communication between the target and the tracking unit. The laser tracker 20 is capable of being miniaturized by incorporating both the absolute distance measurement and the interferometer electronics, for example, in the gimbaled portion of the tracking unit. This provides certain advantages, such as reduced weight, reduced size, minimization of external connections, quicker tracking speeds, and the like.

Attached to the end-effector of a robot or a spindle 40 of a machine tool is an embodiment of the active target 50 of the present invention. Active target 50, in turn, is movable in elevation ($EL_T$), or pitch rotation about an x-axis, and in azimuth ($AZ_T$), or yaw rotation about a z-axis. With the design of the active target 50, rotation in azimuth is a full, unlimited 360° rotation, as will be described more fully hereinafter. The active target 50 also is capable of full, unlimited 360° rotation about the elevation axis although this capability may not be utilized fully in most applications of the active target. Rotation of active target 50 is with respect to perpendicular axes wherein the z-axis extends coaxially with the centerline of the shank 52 of the active target, and the x-axis is substantially coaxially aligned with the centerline of the head 54 of the active target.

The distance measurements between the laser tracker 20 and the active target 50 can be accomplished using known techniques, such as, for example, a pulsed laser configuration, repetitive time of flight pulses, phase/intensity modulation of the laser beam, or the like. These various techniques can provide absolute ranging of the active target. Thus, the active target does not have to be returned to a known position, as with an interferometer, before distance measurements can commence. An absolute distance measurement technique can also be used to determine the initial distance, and then an interferometer-based technique used for distance measurement.

Figure 2:
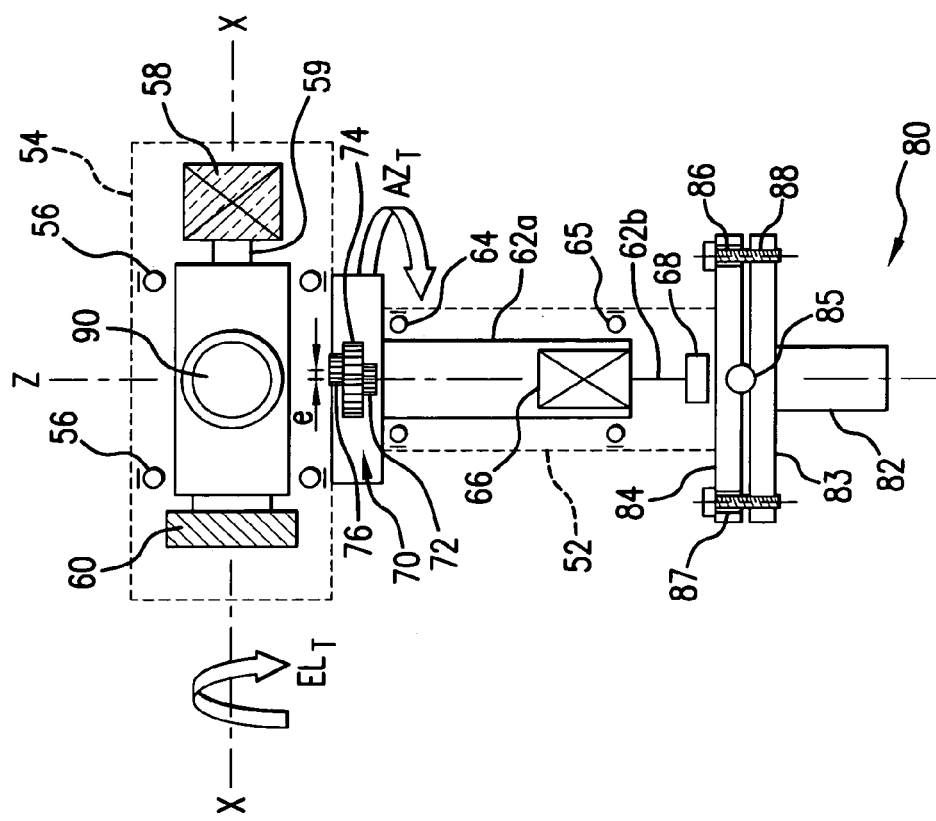
FIG. 2 is a schematic, cross-sectional diagram of the active target of FIG. 1.

FIG. 2 is a schematic, cross-sectional diagram of active target 50. Head portion 54 houses an optical module 90 rotatably supported by a first set of bearing assemblies 56. An elevation motor 58 is operatively connected to optical module 90 to rotate the module in elevation, about the x-axis of active target 50. Elevation motor 58 is fixed with respect to the housing of head portion 54, and upon activation rotates optical module 90 via a drive shaft 59 which connects the elevation motor to the optical module.

Control element 60 is in electrical communication with elevation motor 58 and controls activation of the elevation motor in response to signals generated by optical module 90 to pitch the optical module in either direction about the x-axis of the active target 50. Preferably, the range of rotational movement of optical module 90 about the x-axis is 135 degrees. Control element 60 includes the circuitry necessary for the active target 50 to perform as described herein. If the power source for the active target 50 is one or more on-board batteries, the batteries also are included with control element 60.

The head 54 of active target 50 is rotatably coupled to shank portion 52 of the active target by shaft lengths 62a, 62b extending into the shank portion and rotatably supported by a second set of bearing assemblies 64 and 65, respectively. An azimuth motor 66 is operatively connected at its ends to shaft lengths 62a and 62b, to rotate the active target head 54 in either direction about the z-axis of the active target 50. The shaft length 62b distal from head portion 54 is fixed with respect to the housing of shank portion 52 through a shaft coupling 68 fixed to the housing. That is, shaft length 62b does not rotate about the z-axis. The use of shaft coupling 68 ensures that the target head 54 rotates smoothly even though the rotational axis of motor 66 may not be perfectly aligned with bearing assemblies 64 and 65.

Shaft length 62a is fixedly connected at one end to the head portion 54 and coupled at the other end to azimuth motor 66 and rotates with the motor about the z-axis. Fixed electrical contacts (not shown in FIG. 2) disposed in the interface between head portion 54 and the shank 52 provide the electrical communication between control element 60 and azimuth motor 66. When activated azimuth motor 66 rotates about the z-axis, together with shaft length 62a and the head 54 of the active target 50. Shaft length 62b remains stationary.

Alternatively a slip ring mechanism positioned in the interface between the head 54 and the shank portion 52 may be used in place of the fixed electrical contacts to provide the electrical connection and unlimited 360° rotation in either direction of the active target head relative to the shank portion. Slip ring mechanism of this type are known to those skilled in the art, and further description is deemed unnecessary.

In response to signals generated by optical module 90, control element 60 controls activation of both the elevation motor 58 and the azimuth motor 66 to maintain the optical module facing tracker laser beam 24 at all times. Motors 58 and 66 can be servo motors of known or later-developed design.

An elevation axis center adjustment mechanism 70 secured to shaft length 62a and located adjacent to the interface between head 54 and shank portion 52 of the active target 50 provides for adjustment of the offset e such that the intersection of the z-axis with the x-axis is exactly at the optical center of the optical module's retroreflector 92. This is done in combination with an adjustment mechanism to adjust the position of retroreflector 92 along the x- and z-directions. Adjustment mechanism 70 comprises a set of coacting elements which, when rotated will cause shifting movement of the head 54 relative to shank portion 52. By way of example, adjustment mechanism 70 can be embodied as a set of vertically-disposed cylindrical disks, as shown diagrammatically in FIG. 2. Disks 72 and 74, which may have different diameters, are fixed coaxially with respect to the central axis of shaft length 62a. Fixed to the upper surface of disk 74, in the orientation shown in FIG. 2, is a disk 76 having a smaller diameter than disk 74. The position of disk 76 on the disk 74 is such that the central vertical axis of disk 76 is offset relative to the central vertical axis of disk 74 to create an eccentric configuration. That is the central vertical axes of disks 74 and 76 are not coaxial. Rotation of disks 74 causes the disk 76 to trace an eccentric path. A circular recess (not visible in FIG. 2) is provided on the lower surface of head portion 54 to receive therein the disk 76, with the circumferential surface of disk 76 in frictional contact with the circumferential surface of the recess.

With the adjustment mechanism 70 configured as described above, it can be seen that by selective rotation of disk 74, the disk 76 will cause shifting movement of the head portion 54 to reduce the value of offset e so that the z-axis intersects with the x-axis at the optical center of the optical module's retroreflector. After this adjustment is made, shank portion 52 and head portion 54 are secured to prevent disturbance of the adjustment.

Figure 5:
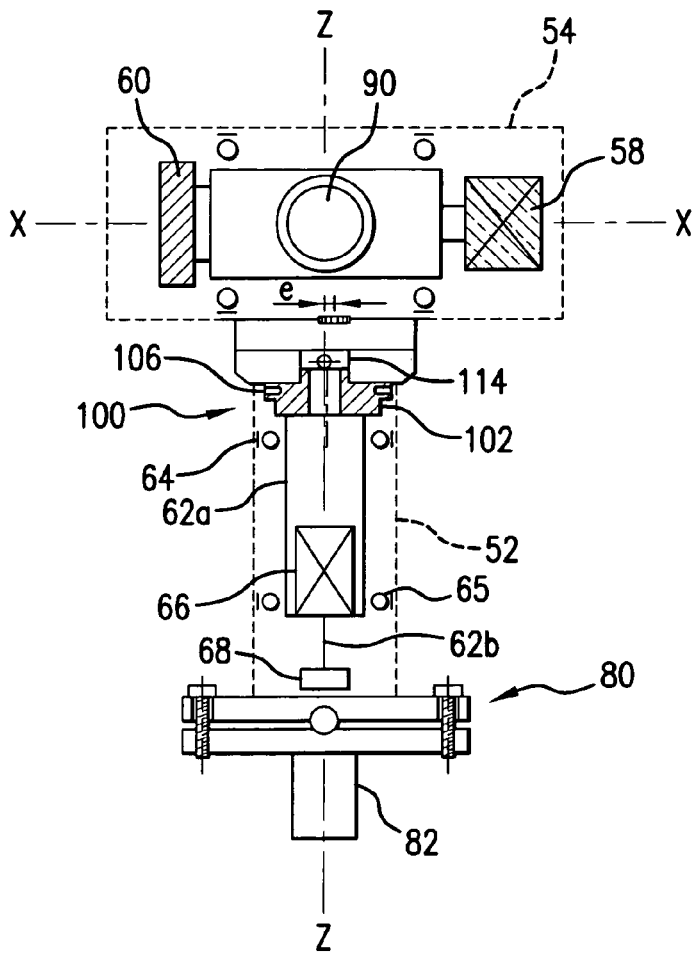
FIG. 5 is a schematic, cross-sectional diagram of the active target of FIG. 1 showing an alternate embodiment of the alignment adjustment mechanism of the present invention.
Figure 6A:
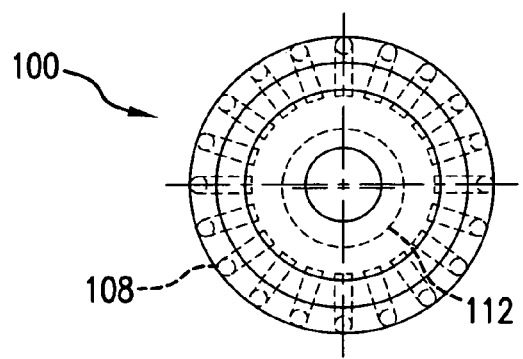
FIGS. 6a and 6b are plan and side view, respectively, of the adjustment wheel of FIG. 5.
Figure 6B:
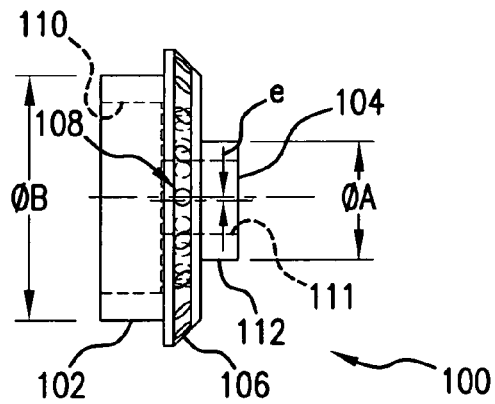

An alternate configuration of the elevation axis center adjustment mechanism is shown in FIGS. 5, 6a and 6b. Adjustment disk 100, which preferably is of one-piece construction, includes cylindrical end portions 102 and 104 joined by an intermediate portion 106 having a truncated conical configuration. Cylindrical end portion 102 has a larger outer diameter than cylindrical end portion 104. Spaced around the periphery of truncated conical portion 106 are a plurality of radially-directed holes 108 which are used to adjust the intersection alignment of the rotational axis (x-axis) of head 54 and the longitudinal axis (z-axis) of the shank 52.

The central, longitudinal axis of cylindrical end portion 102 and the central, longitudinal axis of cylindrical portion 104 are non-coaxial, resulting in an offset e between the axes, of approximately 0.006 inches. This offset can be achieved by machining the outer cylindrical surface of one of the cylindrical end portions first, such as end portion 102, using its central longitudinal axis as the rotary axis. Then, in a similar fashion, the outer cylindrical surface of the other cylindrical end portion, which would be end portion 104 in this instance, using its central longitudinal axis as the rotary axis during machining. The rotary axis for the end portions are non-coaxial to produce the desired offset e. As best seen in FIG. 6a, this offset results in a gradual variation of the radii of cylindrical portion 104 relative to the central axis of cylindrical portion 102, such that the outer circumferential surface provides an eccentric or cam-like surface 112 with respect to the central, longitudinal axis of cylindrical portion 102. The order in which the outer surfaces of the end portions are machine is not critical provided the rotary axes during machining are non-coaxial.

Each of the cylindrical end portions 102 and 104 is provided with a bore 110 and 111, respectively. Due to the different sizes of the cylindrical end portions, bores 110 and 111 preferably are of different diameters, with bore 110 being larger than bore 111. When the active target 50 is fully assembled, bores 110 and 111 provide a passage for wiring extending between shank 52 and head 54.

As can be seen from FIG. 5, when assembled the adjustment disk 100 is positioned in the juncture between the shank 52 and the head 54. The outer diameter of cylindrical end portion 102 is sized so that disk 100 is received within shank 52. The outer diameter of cylindrical end portion 104 is sized to be received within a recess 114 provided in the head 54.

When the active target 50 is being assembled and calibrated, as described more fully below, fasteners (not shown in FIG. 5) which join the shank 52 to the housing of head 54, such as threaded fasteners, are loosened slightly. A pin or similar implement is inserted into one of the holes 108 to turn the disk 100 in either direction. Due to the non-coaxial alignment of the longitudinal axes of cylindrical end portions 102 and 104 and the eccentric surface 112, the head 54 can be moved sufficiently to shift the z-axis of the shank 52 so that it intersects with the rotational, x-axis of the head 54 at exactly the optical center of the optical target 92. After this alignment is achieved, the shank 52 and head 54 are securely joined by tightening of the fasteners to prevent shifting of this intersection.

Instead of incorporating one of the configurations of the eccentric adjustment mechanisms 70 or 100 described above, an alternate embodiment of the active target of the present invention may use angle position sensors and a level sensor. An angle position sensor, such as an angle encoder, can be mounted in the head portion 54 to measure the rotation of optical module 90 about the elevation, x-axis. A level sensor, such as an electronic level, can be positioned perpendicularly to the incoming laser beam. Another angle position sensor, such as an angle encoder, can be mounted in the shank portion 52 of the active target 50 to measure the rotation of the head portion 54 about the azimuth, z-axis. With the readings from the two angle position sensors and the level sensor, the control unit 30 can then make the necessary adjustments with regard to the optical center of the optical target 92 using appropriate software corrections.

An illustrative coupler assembly 80 at the end of shank portion 52 opposite from the head of active target 50 permits removable of the active target to the exemplary machine tool spindle 40 shown in FIG. 1. Preferably, coupler assembly 80 includes a cylindrical stem 82 connected at one end to an annular flange 83. The annular flange 83 is designed to mate with a similarly-configured flange element 84 on the end of shank portion 52. Disposed between the annular flange 83 and flange element 84, is a ball 85 received within oppositely-positioned hemispherical recesses provided on the facing surfaces of the annular flange and the flange element. A plurality of angular adjustment elements 86 are received within bores 87 and 88 spaced circularly on annular flange 83 and flange element 84, respectively. During assembly, the bores 87 and 88 are aligned axially to permit insertion of the angular adjustment elements 86 through both the annular flange 83 and flange element 84 to securely join shank portion 52 with coupler assembly 80. The adjustment elements conveniently may be embodied as threaded elements as shown in FIG. 2, such as screws or bolts.

As configured, coupler assembly 80 provides an angular adjustment mechanism for adjustment of the run out. Selective loosening and tightening of angular adjustment elements 86 permits repositioning movement of flange element 84 and shank portion 52 relative to the annular flange 83. This relative movement between the flange members, with cylindrical stem 82 being fixed in the machine tool, permits adjustment of the longitudinal rotational axis of machine spindle 40 to pass through optical center of optical target 92 at the intersection of the elevation and azimuth axes.

While the coupler assembly 80 has been exemplarily described as having a cylindrical stem 82 to permit mounting of the active target 50 into a chuck on the machine tool spindle, the coupler assembly may have different designs to provide other means for mounting the active target to a machine tool. As an illustrative example, angular flange 83 may be provided with mounting holes which coact with suitable fasteners to mount the active target to a machine tool or other element to which the target may be mounted.

It can be seen from FIG. 2 that the design of the active target 50 supports the optical module 90 at the center of two motorized gimbal rings. The outer gimbal ring effectively is constituted by the shaft 62, formed of shaft lengths 62a and 62b, supported at its ends by second bearing assemblies 64, 65 for rotation about the z-axis. The inner gimbal ring effectively is constituted by the optical module 90 which is supported within the head 54 by first bearing assemblies 56 for rotation about the x-axis by elevation motor 58. At the same time, the head 54 and optical module 90 are supported by shank portion 52 for rotation about the z-axis by azimuth motor 66. The x- and z-axes are perpendicular to each other, and intersect at the center of the retroreflector of the optical module assembly. Thusly supported, the optical module 90 can be maintained aligned with the tracker laser beam at all times, regardless of the position or orientation of the active target 50 as it is moved by the exemplary machine tool spindle during, for example, calibration of the machine tool or during machining operation or, as described below, while making measurements for volumetric error compensation.

Figure 3:
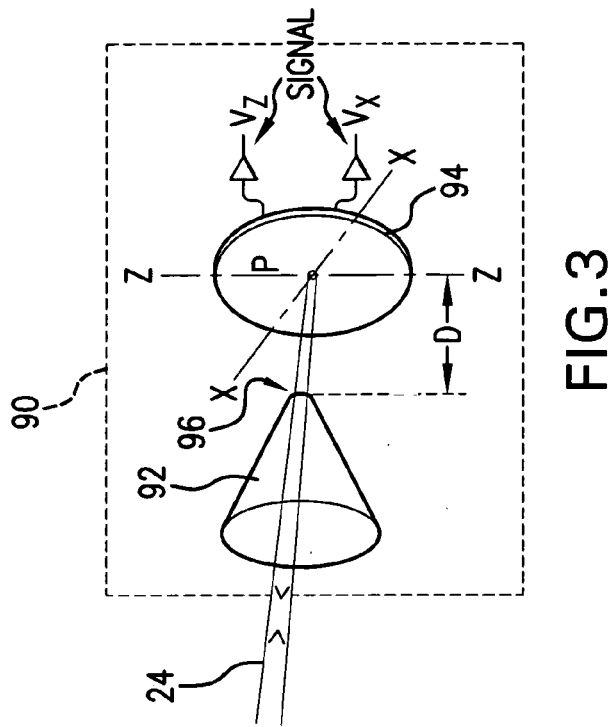
FIG. 3 is a schematic, side view diagram of the optical module of the active target shown in FIGS. 1 and 2.

FIG. 3 is a schematic, side view diagram of the optical module 90 illustrating an exemplary means for determining the pitch and yaw orientation of the active target 50 according to one embodiment of the present invention. Optical module 90 includes an optical target 92 and a position sensor, or pitch and yaw sensor 94. Pitch and yaw sensor 94 can be a position sensitive photodetector. The optical target 92 may be a retroreflector which is modified with an aperture 96 at its apex to allow a small portion of the incident laser beam 24 to pass through. Pitch and yaw sensor 94 is positioned behind aperture 96 to receive the small portion of the laser beam. Laser beam 24 from laser tracker 20 (see FIG. 1) strikes optical target 92 of optical module 90. At least a small portion of laser beam 24 passes through aperture 96 of optical target 92 and is detected by pitch and yaw sensor 94.

Optical target 92 can be a hollow retroreflector or a solid retroreflector. As is known to those skilled in the art, a hollow retroreflector includes three mirrors which are positioned perpendicular to each other. An apex is formed at the common extremity of the mirrors and, preferably, a small hole located at the apex forms the aperture. If a solid retroreflector is used, a small flat surface near the apex is polished to create a way to allow at least part of the laser beam to pass through to fall or focus onto the pitch and yaw sensor. The flat surface behaves similarly to an aperture. A virtual optical center is created to eliminate laser beam lateral movement during rotation of the optical target. Reference is made to Applicant's U.S. Pat. No. 7,230,689 for a fuller discussion of these retroreflectors.

While not shown in FIG. 3, a filter/attenuator may be positioned between aperture 96 and pitch and yaw sensor 94 to filter and attenuate the portion of the laser beam passing to the sensor and also to reduce the influence of any ambient light incident onto the sensor.

Pitch and yaw sensor 94 is used in determining the orientation of optical target 92 relative to the pitch and yaw axes of the optical module 90, and hence of the active target 50. An exemplary technique for determining this orientation is described with reference to FIG. 3.

When optical target 92 indicates no yaw movement, or rotation about the z-axis, laser beam 24 goes through aperture 96 and is detected by pitch and yaw sensor 94 at an origin or reference point P. However, any yaw movement of optical target 92 would result in laser beam 24 being detected by pitch and yaw sensor 94 at a location other than reference point P, for example, to the right or left of point P along the direction of axis x-x, depending upon which direction yaw movement occurs. This displacement is represented by the vector $V_x$. Preferably, optical target 92 and pitch and yaw sensor 94 are configured to detect a large range of yaw movements, up to at least about 30 degrees, depending on size and other factors.

Similarly, the pitch movement of optical target 92 can be detected and measured using the optical target 92 and pitch and yaw sensor 94. At a zero pitch movement, laser beam 24 goes through aperture 96 and is detected by pitch and yaw sensor 94 at reference point P. If there is a pitch movement, a different part of pitch and yaw sensor 94, either above or below reference point P in the direction of axis z-z, would detect the laser beam light. This displacement is represented by the vector $V_z$. By calculating the magnitude of vectors $V_x$ and $V_z$ and knowing the separation distance D between aperture 96 and the surface of pitch and yaw sensor 94, the change in angular orientation of optical target 92 with respect to the laser beam 24 can be determined. The values of $V_x$ and $V_z$ are output by pitch and yaw sensor 94 to control element 60.

When the optical target undergoes both pitch and yaw movements, the portion of laser beam 24 passing through aperture 96 will be detected by pitch and yaw sensor 94 at some point offset from both the x- and z-axes, at a point within one of the four quadrants virtually formed by the intersecting axes. This displacement can be resolved into corresponding $V_x$ and $V_z$ vectors.

The signals $V_x$ and $V_z$ are used by the control element 60 to control activation of elevation motor 58 and/or azimuth motor 66 to move the head 54 of the active target 50, and thus optical target 92, in the desired direction to bring the portion of laser beam 24 incident on the pitch and yaw sensor 94 back to the reference point P. In this manner, the laser tracker 20 always tracks to a pre-defined single point on the active target 50, which does not move in space when the target head portion 54 and/or optical target 92 makes pure rotation. Thus, the optical target 92 is always aligned with the tracker laser beam 24 regardless of the movement or orientation of the machine tool or other end-effector on which the active target 50 is attached.

Pitch and yaw sensor 94 can be configured as a planar detector which, for example, can be a charge coupled device (CCD) or a CMOS-type camera of known design, both of which are configured to produce a 2-dimensional image based on light intensity incident as a function of position on the detector. As known in the art, a CCD array sensor can include multiple pixels arranged in an array. The use of CCD array sensors for detection of light is known in the art, for example, in digital cameras. Therefore, no further description is believed to be necessary. Digital output from the CCD array sensor can be processed by a repeater (not shown). Alternatively, the laser light sensor includes an analog position sensitive detector of known design. An amplifier/repeater can be associated with the detector to amplify analog signals or digital signals produced by detector.

Use of retroreflector optical target 92 and pitch and yaw sensor 94 in active target 50, as described above, provides several advantages. For example, the active target 50 can be more functional in an upside-down orientation, which is otherwise not possible.

Electrical power for the active target can be supplied with conventional power cables or, preferably, the power source can be self-contained within the active target. One or more batteries are contained within the active target to provide power for the elevation and azimuth motors and the control element. This results in a compact, self-contained, easily-maneuvered active target without the need for power cables which may interfere with the mobility of the target, the measurement or calibration procedure, or the machining process. Preferably, the batteries are of the rechargeable type to permit recharging of the batteries when the active target is not in use.

While the active target of the present invention has been described as being mounted on a robotic end-effector such as a machine tool, it can readily be appreciated that the active target could be mounted on the workpiece or the machine itself if it is desired to monitor the position and orientation of these elements for purposes of calibration or re-calibration during the machining process and/or between discrete steps in the process.

With the performance capabilities of the disclosed active target, it is anticipated that a measurement system using only a single laser tracker with a single active target of the present invention will be required for a sizeable workspace envelope to obtain a high degree of accuracy in the measured results. This provides a significant improvement over known systems used for the same measurement requirements.

To cover a large working volume, on the order of 200 m by 200 m or larger, multiple setups of the laser tracker may be needed, and the data from multiple trackers can be bundled and processed by the control unit. Also, to save measurement time when multiple setups are needed, it may be desirable to use additional laser trackers. By way of example, sometimes one machine axis may have multiple drives, such as a master and a slave drives. To measure simultaneously both drives, more than one laser tracker may be needed.

Figure 4:
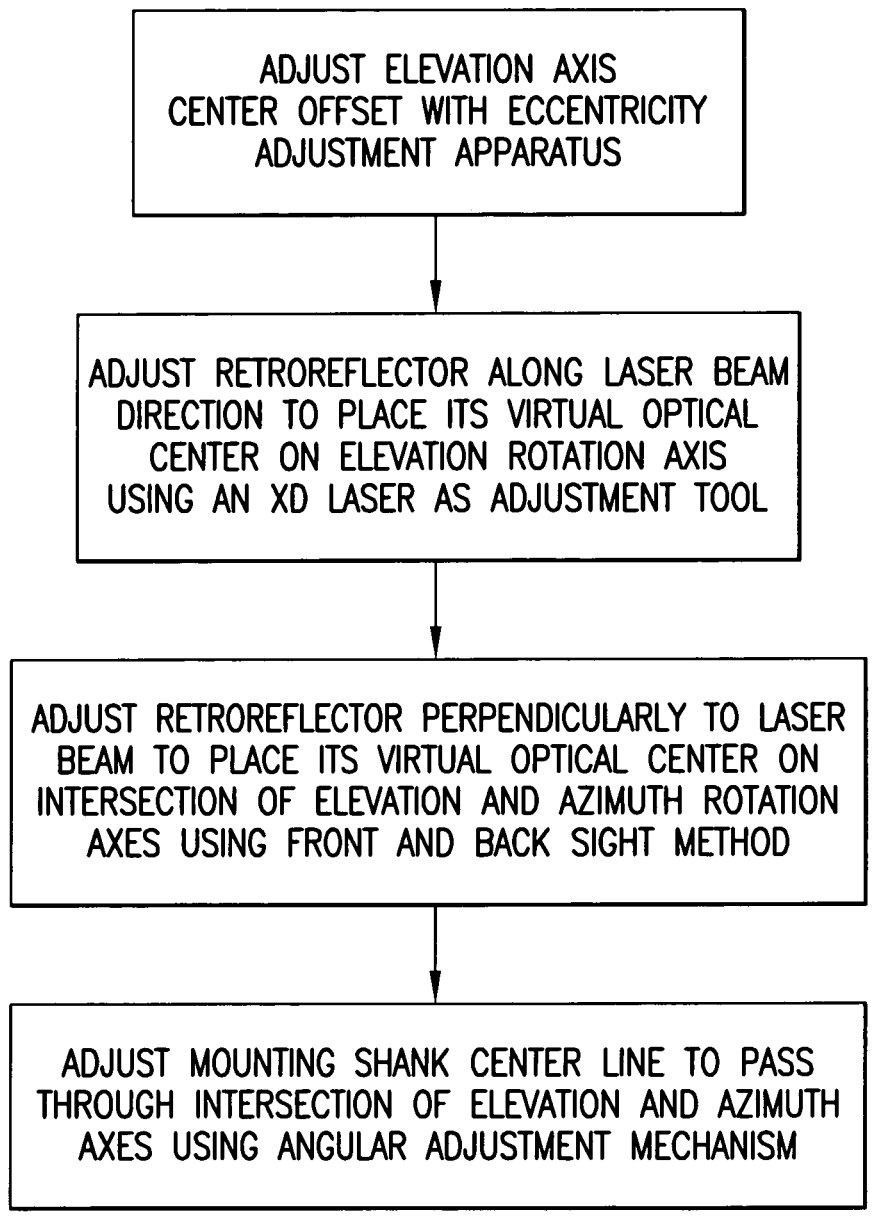
FIG. 4 diagrammatically illustrates the initial adjustments of the active target of the present invention prior to use.

FIG. 4 diagrammatically illustrates the process involved in the initial adjustments of the active target of the present invention prior to use. Except for the last step, the adjustments are made at the factory before the active target is shipped to the customer.

The elevation axis center offset is adjusted with the adjustment mechanism 70 or 100, as described above, to eliminate the offset e. This adjustment ensures that the azimuth axis of active target 50 passes through the center of the elevation axis, and the inter-section of the azimuth and elevation axes is exactly at the optical center of the optical module's retroreflector. Once the proper adjustments have been made, access to adjustment mechanism is closed. Further adjustment is not necessary during use of the active target under normal conditions.

Adjustment is then made to position the retroreflector, or the optical target 92, along the direction of laser beam 24 to place its virtual optical center on the elevation rotational axis using an alignment laser device as an adjustment tool. An example of a suitable alignment laser tool is the XD laser commercially available from Automated Precision Inc., Rockville, Md. The XD laser measurement system has the capability to simultaneously measure all axis errors for rapid machine tool error assessment. By adjusting for any detected axis errors the virtual optical center of the retroreflector can be correctly positioned on the elevation rotational axis.

Next, the optical target 92 is adjusted to position the retroreflector perpendicularly to the incident laser beam 24 to place the virtual optical center of the optical target on the intersection of the elevation and azimuth rotational axes. This is achieved using the front and back sight method. Briefly, this method involves assessing, from one direction, the deviation of the virtual optical center from the correct position at the intersection of the axes, and making the adjustment to correct the deviation. Then the assessment and correction procedure is repeated from a second direction 180 degrees removed from the first direction.

After the active target 50 has been installed on the machine tool, or other point of use, final adjustment is made to ensure that the centerline of the rotational axis of machine spindle 40 passes through the intersection of the elevation and azimuth rotational axes and optical center of optical target 92, as described above, by adjustment of one or more of the angular adjustment elements 86.

After installation of the active target, initialization and calibration of the target and the laser tracker are made, and the precision measurement system with the active target is ready for use.

The active target of the present invention has the advantage of automatically positioning the optical target so that is always facing the tracking head of the laser tracker. The active target will stay locked on the laser beam regardless of its movement or orientation in space. The beam will not be lost even within quick and uncontrolled movements of the of the active target.

Figure 7:
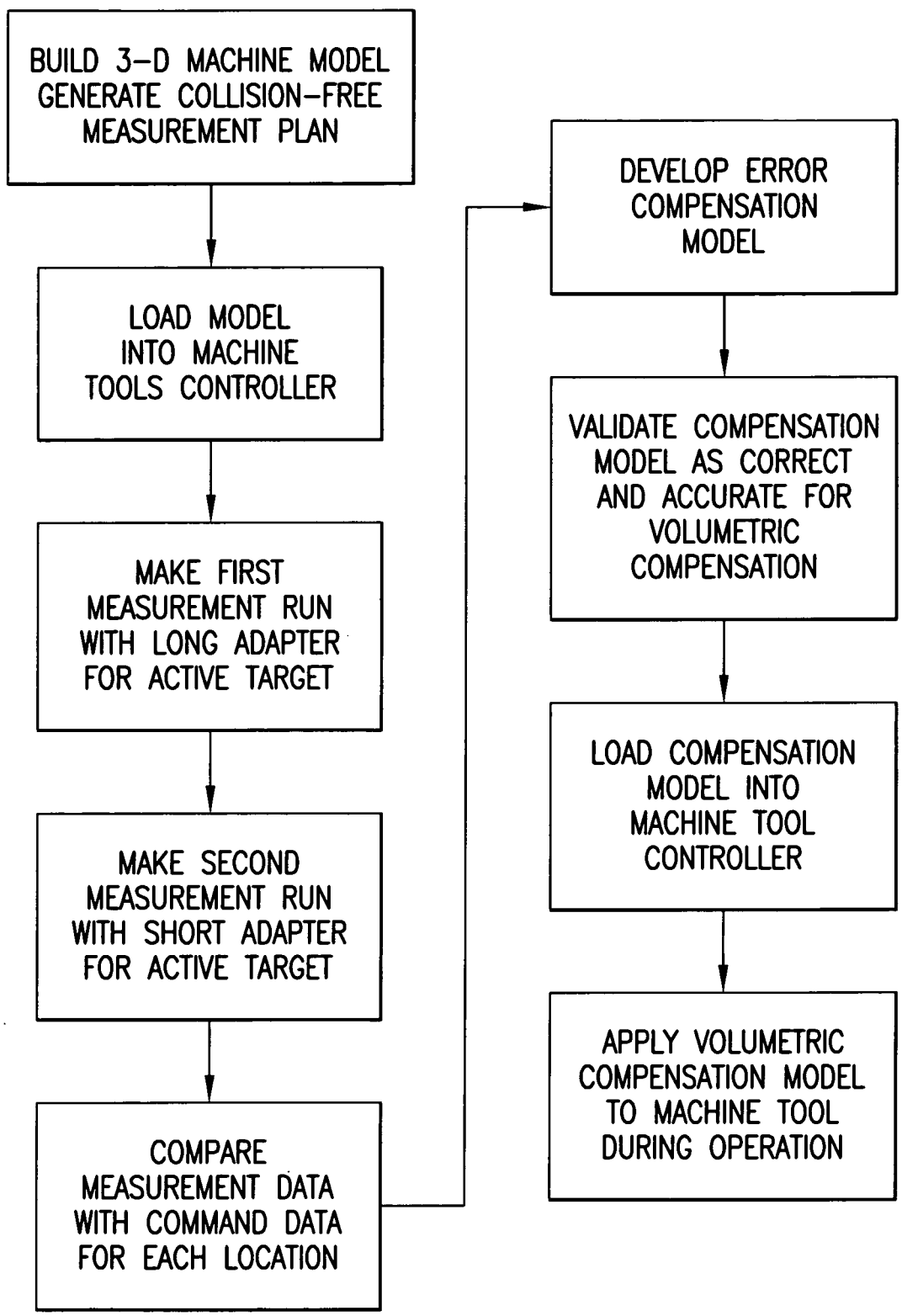
FIG. 7 diagrammatically illustrates a method for using the precision measurement system of the present invention to provide volumetric error compensation data.

An illustrative example of how a measurement system using the active target of the present invention can be used advantageously to provide measurement data which can be used to compensate for errors introduced by large-volume work space and/or large-scale machine tools is described below with reference to the diagram of FIG. 7.

The first step of the process is to build a 3-dimensional machine model for kinematic calculations and collision detection purposes. Preferably, appropriate software, such as software developed by Applicant, can be used to build the 3-dimensional machine model for different types of machines. The model produces a complex path for the laser tracker to follow for all of the different setups of the machine, carefully avoiding all obstacles during the measurement process. Within the machine's working volume, between 200 and 400 random points are generated to represent all of the possible machines poses in each axis as the final measurement plan. The software simulation ensures these random points are collision-free and will not break the laser beam from the laser tracker to the active target during measurement.

Once the measurement plan is loaded into the machine tool controller, the actual measuring can begin. The laser tracker is placed in a fixed position and the active target is mounted to a long adapter and secured to the machine tool for the first measurement run. As noted below, a long adapter and a short adapter are used to mount the active target to the machine tool to improve further the accuracy of the measurements.

The laser tracker and the active target interact to maintain constant measuring contact as the machine tool is positioned to each of the random points, forming a point cloud within the machine's work envelope. As the machine reaches each designated point, it stops for a few seconds to stabilize. The measurement system of the present invention can then measures the point numerous times in a very short span of time, as many as 200 times in less than 3 seconds. These measurements are then averaged to give the most accurate positioning of the point in all 6 degrees of freedom.

After the first run, the active target is mounted on a short adapter and secured to the machine tool, and the process begins again and runs through the same points a second time. By using the long and short adapters with the active target, every point is measured not only in the linear x, y, z positions, but the system also captures each point's orientation in space as well, with pitch, yaw and roll data.

Once the measurement runs are complete, the data is then compared with the actual commanded or desired locations. These locations are usually predefined for the path the machine tool is to travel and/or the locations where the machine tool is to perform a desired function or functions. A set compensation values is then developed which will dramatically reduce the machine's tolerance errors. These values are validated as correct and accurate for volumetric compensation before they are loaded into the machine's controller. The volumetric compensation data can be determined, for example, by using a mathematical, kinematic error model of the machine. It can be appreciated that appropriate software would perform the necessary computations in developing and validating the compensation values.

After the machine tool is calibrated, and when the production machine is commanded to a desired location, the volumetric compensations are automatically applied during the movement of the machine to improve the path and actual location of the machine tool.

The volumetric error compensation process provides a fast and accurate compensation of positional errors of machine tools. Since all of the measurements are quickly made with the system of the present invention, there is very little thermal drift due to temperature fluctuations.

The volumetric error compensation system with the active target of the present invention provides rapid, precise measurements for calibration and re-calibration of machines and machine tools as well. Afterwards, the active target may be removed until it is desired to perform another calibration procedure or volumetric error compensation procedure. Alternatively, the active target may be left mounted on the machine tool to provide real-time data on the position and orientation of the target and the machine tool.

The active target of the present invention may be utilized in many different applications besides tool calibration and volumetric error compensation. The target may be used wherever it is desirably or necessary to maintain constant, unbroken optical communication between the target and the laser tracker.

Many modifications and other embodiments of the invention will be apparent to one skilled in the art having the benefit of the teachings presented in the foregoing description and the associated drawings. Therefore, it is understood that the invention is not to be limited to the specific embodiments disclosed, and that other modifications and embodiments are intended to be included within the scope of the invention as disclosed herein.

What is claimed is:

1. A target for a multi-dimensional tracking system having a tracker and a laser light source, comprising:
an optical target adapted to communicate with the laser light source;
a position sensitive detector operatively coupled with said optical target and operative to provide an indication of the orientation of said optical target relative to the laser light;

first support means to rotatably support said optical target and said position sensitive detector about a first rotational axis;

second support means to rotatably support said optical target and said position sensitive detector about a second rotational axis disposed orthogonal to said first axis, said first support means being rotatably coupled to said second support means;

first motive means coupled to said first support means to cause rotational movement of said optical target and said position sensitive detector about said first rotational axis;

second motive means operatively coupled to said second support means to cause rotational movement of said optical target and position sensitive detector about aid second rotational axis; and control means responsive to the output of said position sensitive detector to control operation of said first motive means and said second motive means, whereby said optical target is maintained facing the tracker at all times as the target is moved.

2. The target of claim 1, wherein said first support means supports said optical target for 360 degree rotation about said first rotational axis and said second support means supports said optical target for 360 degree rotation about said second rotational axis.

3. The target of claim 2, further comprising an eccentrically disposed means positioned between said first support means and said second support means and operative to adjust the intersection point of said second rotational axis with said first rotational axis to be at the optical center of said optical target.

4. The target of any one of claims 1, 2 and 3, wherein said first motive means and said second motive means comprise servo motors responsive to the output of said position sensitive detector as feedback signals to maintain said optical target facing the tracker at all times.

5. The target of any one of claims 1, 2 and 3, wherein said optical target comprises a retroreflector having an aperture at the apex of said retroreflector to permit passage of a portion of laser light impinging upon said retroreflector, said position sensitive detector being disposed behind said aperture to receive the laser light passing therethrough.

6. An active target for a multi-dimensional measuring system having a tracking device and a source of laser light, comprising:

an optical target adapted to communicate with the source of laser light;

a first gimbal assembly supporting said optical target for rotation about a first rotational axis;

a first motive means operative to cause rotational movement about said first rotational axis;

a second gimbal assembly supporting said first gimbal assembly for rotation about a second rotational axis orthogonally disposed relative to said first rotational axis; and a second motive means operative to cause rotational movement of said first gimbal assembly about said second rotational axis, whereby said optical target is supported at the center of said first and said second gimbal assemblies.

7. The active target of claim 6, further comprising a position sensitive detector disposed adjacent to said optical target and operative to provide an indication of the orientation of said optical target relative to the laser light; and control means responsive to the output of said position sensitive detector to control said first motive means and said second motive means to maintain said optical target facing the tracking device at all times.

8. The active target of claim 7, wherein each of said first motive means and said second motive means comprises a servo motor responsive to the output of said position sensitive detector as feedback control signals to maintain said optical target facing the tracking device at all times.

9. The active target of claim 8, wherein said optical target comprises:

a retroreflector having an apex; and an aperture at said apex to pass a portion of the laser light impinging upon said retroreflector, said position sensitive detector being disposed behind said aperture to receive the laser light passing therethrough.

10. The active target of any one of claims 7 to 9, wherein said first gimbal assembly comprises:

support means to fixedly support said first motive means;

coupling means connecting said first motive means to said optical target; and rotatable support means supporting said optical target for 360 degree rotation about said first rotational axis.

11. The active target of claim 10, wherein said second gimbal assembly comprises:

second support means to fixedly support said second motive means;

second coupling means connecting said second motive means to said support means of said first gimbal assembly; and second rotatable support means supporting said second coupling means to provide said optical module 360 degree rotation about said second rotational axis.

12. The active target of claim 11, further comprising an eccentrically movable means to adjust the orientation of the rotational axis of said second gimbal assembly to intersect the rotational axis of said first gimbal assembly at the optical center of said optical module.

13. A multi-dimensional measurement system having a laser tracker, a laser light source, a controller device and a remote target, said remote target comprising:

an optical module adapted to communicate with the laser light source;

a position sensitive detector operatively coupled with said optical module and operative to provide an indication of the orientation of said optical module relative to the laser light;

first support means to rotatably support said optical module and said position sensitive detector for 360 degree rotation about a first rotational axis;

first motive means coupled to said optical module to cause rotational movement of said optical module and said position sensitive detector about said first rotational axis;

second support means to rotatably support said optical module and said position sensitive detector for 360 degree rotation about a second rotational axis; and second motive means operatively coupled to said optical module to cause rotational movement of said optical module and position sensitive detector about said second rotational axis, whereby said optical module is maintained facing the laser tracker at all times as the remote target is moved multi-dimensionally.

14. The measurement system of claim 13, further comprising control means responsive to the output of said position sensitive detector as feedback control signals to control said first motive means and said second motive means to maintain said optical module facing the laser tracker at all times.

15. The measurement system of claim 14, wherein said first rotational axis and said second rotational axis are orthogonally oriented and intersect at the optical center of said optical module.

16. The measurement system of any one of claims 13, 14 and 15, wherein said first motive means and said second motive means comprise servo motors responsive to the output of said position sensitive detector as feedback signals to maintain said optical module facing the laser tracker at all times.

17. The measurement system of any one of claims 13, 14 and 15, wherein said optical module comprises a retroreflector having an aperture at the apex of said retroreflector to permit passage of a portion of laser light impinging upon said retroreflector,
   said position sensitive detector being disposed behind said aperture to receive the laser light passing therethrough.

18. A measurement system for an multi-dimensional movable object, the system comprising a laser tracker having a source of laser light, a control device and an active target which can be attached to the movable object, the active target comprising:
   an optical module adapted to communicate with the laser light source;
   a first gimbal assembly supporting said optical module for rotation about a first rotational axis;
   said first gimbal assembly having a first motive means operative to cause rotational movement of said optical module about said first rotational axis; and
   a second gimbal assembly supporting said first gimbal assembly for rotation about a second rotational axis orthogonally disposed relative to said first rotational axis,
   said second gimbal assembly having a second motive means operative to cause rotational movement of said first gimbal assembly about said second rotational axis,
   whereby said optical module is supported at the center of said first and said second gimbal assemblies.

19. The measurement system of claim 18, further comprising:
   a position sensitive detector disposed adjacent to said optical module and operative to provide an indication of the orientation of said optical module relative to the laser light; and
   control means responsive to the output of said position sensitive detector to control said first motive means and said second motive means to maintain said optical module facing the laser tracker at all times.

20. The measurement system of claim 19, wherein each of said first motive means and said second motive means comprises a servo motor responsive to the output of said position sensitive detector as feedback control signals to maintain said optical module facing the laser tracker at all times.

21. The measurement system of claim 19, wherein said optical module comprises:
   a retroreflector having an apex and an aperture at said apex to pass a portion of the laser light impinging upon said retroreflector,
   said position sensitive detector being disposed behind said aperture to receive the laser light passing therethrough.

22. The measurement system of any one of claims 18 and 19 to 21, wherein said first gimbal assembly comprises:
   support means to fixedly support said first motive means;
   coupling means connecting said first motive means to said optical module; and
   rotatable support means supporting said optical module for 360 degree rotation about said first rotational axis.

23. The measurement system of any of claims 18 and 19 to 21, wherein said second gimbal assembly comprises:
   second support means to fixedly support said second motive means;
   second coupling means connecting said second motive means to said support means of said first gimbal assembly; and
   second rotatable support means supporting said second coupling means to provide said optical module 360 degree rotation about said second rotational axis.

24. A method for compensating for positional errors of an object movable in three-dimensional space under control of a controller, the object having an active target and the position of the object being tracked by a laser tracker tracking on the active target, the method comprising the following steps:
   a. generate a set of command positions the object is to follow in moving in three-dimensional space;
   b. build a three-dimensional machine model to include a complex path for the laser tracker to follow for all positions the object may take;
   c. build a measurement plan to represent all of the possible positions in each axes the object may take;
   d. load measurement plan into controller controlling movement of the object;
   e. place laser tracker in a fixed position;
   f. make measurements of position of object as it is moved to each of the random points in the measurement plan;
   g. compare measurement data for the object with the set of command positions;
   h. develop error compensation model to reduce the differences between the measurement data and the set of command positions;
   i. validate error compensation model as correct and accurate for volumetric compensation;
   j. load error compensation model into the controller controlling movement of the object; and
   k. apply volumetric compensation model as object moves to each command position.

25. The method of claim 24, wherein the building of a measurement plan of step (c) includes ensuring that the positions are collision free of any intervening obstacles to maintain constant laser beam contact between the laser tracker and the active target.

26. The method of claim 25, wherein the making of measurements of step (f) includes repeating step (f) with the active target attached to the object in a different configuration.

* * * * *